United States Patent [19]

Ulmann

[11] Patent Number: 4,881,624
[45] Date of Patent: Nov. 21, 1989

[54] ANGULAR ANTI-RETURN DEVICES ASSOCIATED WITH TURNSTILES

[75] Inventor: Jean-Pierre Ulmann, Paris, France

[73] Assignee: Etablissements Georges KLEIN, Paris, France

[21] Appl. No.: 211,313

[22] Filed: Jun. 24, 1988

[30] Foreign Application Priority Data

Jul. 2, 1987 [FR] France .............................. 87 09395

[51] Int. Cl.$^4$ ............................................. F16D 63/00
[52] U.S. Cl. ...................................... 188/82.2; 49/46; 188/82.3; 188/82.84; 188/163; 188/216; 192/44
[58] Field of Search .................. 188/82.2, 82.3, 82.34, 188/82.4, 82.84, 163, 216; 192/44, 47; 49/46

[56] References Cited

U.S. PATENT DOCUMENTS

| 4,285,418 | 8/1981 | Paine | 188/163 X |
| 4,658,940 | 4/1987 | Ulmann | 49/46 X |

*Primary Examiner*—George E. A. Halvosa
*Attorney, Agent, or Firm*—Townsend and Townsend

[57] ABSTRACT

The invention relates to a dual-action angular anti-return device for a turnstile, comprising a drum fast to the turnstile, a fixed vee open facing the drum, a roller positioned between the vee and the drum and alternately wedgeable between the two faces of said vee and said drum, a support for the roller displaceable alternately by two electromagnets themselves energizable from a source. A capacitor is charged by the source on each energization of any one of the electromagnets and discharged into the other electromagnet as soon as said energization is interrupted, which then results in the desired unwedging of the roller.

10 Claims, 1 Drawing Sheet

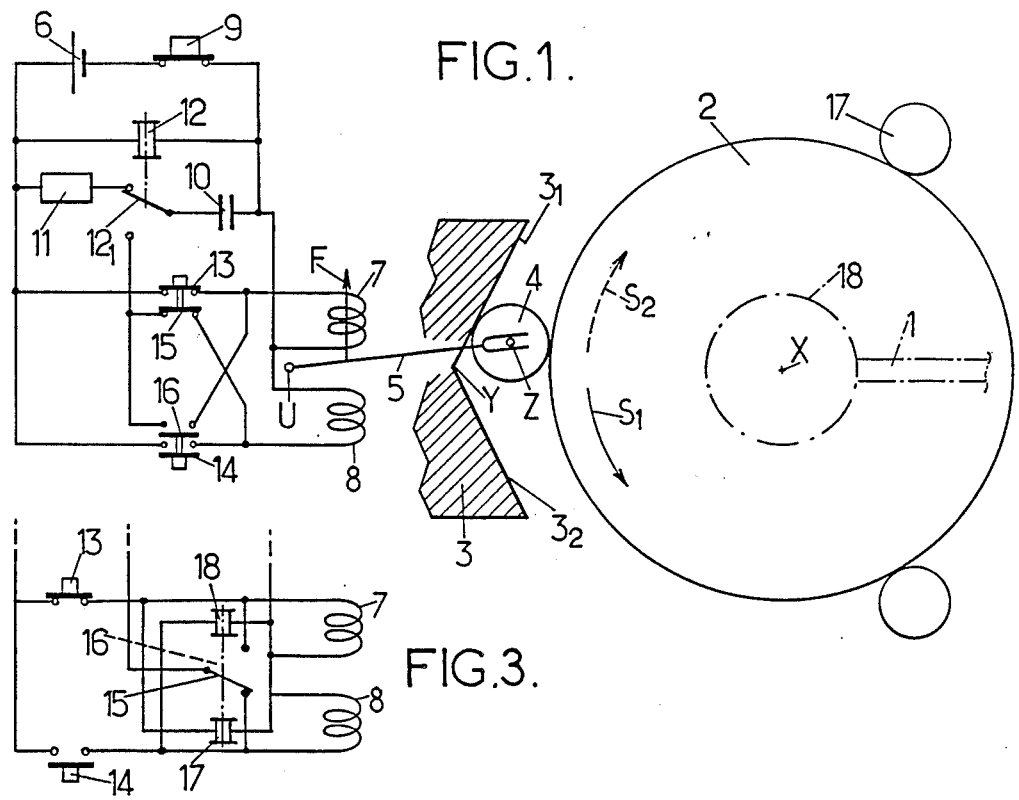
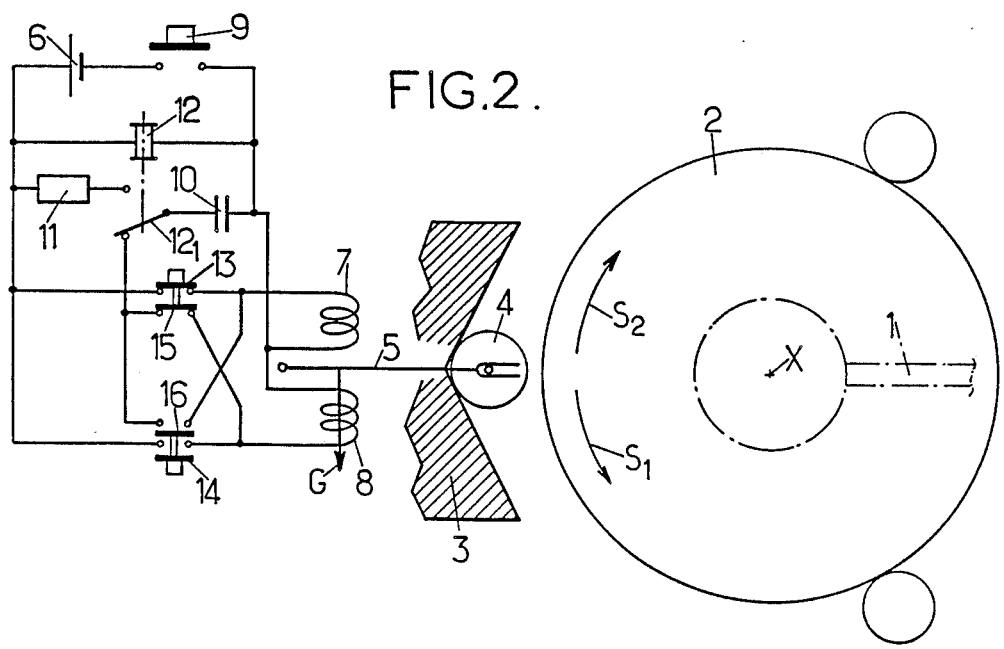

ANGULAR ANTI-RETURN DEVICES ASSOCIATED WITH TURNSTILES

BACKGROUND OF THE INVENTION

The invention relates to devices which are associated with turnstiles in order to permit their angular movements in a particular direction whilst instantaneously preventing their returns or angular movements in the reverse direction from the preceding one.

It relates more particularly, among these devices, to those which are arranged so as to exert as desired their instantaneous angular blocking role in one direction or the other and which comprise for this purpose:

a drum of revolution of axis X fast to the turnstile and coaxial with the latter, a fixed vee whose bisector plane contains the axis X of the drum, this vee being open on the side of this drum and positioned at a short distance from the latter, a roller of axis parallel with the axis X, interposed between the vee and the drum and mounted so that, on a moveable support, it can be moved between a first end position for which it is blocked by wedging between the drum and one side of the vee and a second end position for which it is blocked by wedging between the drum and the other side of the vee, and electromagnetic means to urge the support as desired towards one or other of its two end positions corresponding to the end positions of the roller.

Such a dual-action angular anti-return device operates in the following manner.

When the roller is placed in either one of its two end wedging positions by suitable energization of the electromagnetic means, it is not possible to make the drum, and hence the turnstile, rotate in the direction which would tend to increase this wedging of the roller through the effect of friction which exists between this roller and the drum.

On the contrary rotations of the drum and of the turnstile in the reverse direction are possible at least when authorization thereof is given by control means known to the technician and outside the present invention.

When the electromagnetic means are not energized, the roller is found to be in an unwedged neutral position and angular movements of the turnstile are possible in both directions, provided that the abovementioned authorization has been given.

Dual-action angular anti-return devices of the above type have been described in U.S. Pat. of Applicant No. 4658940 and in general give every satisfaction.

However it may happen that certain difficulties will be encountered to suppress the angular blocking of the turnstile produced for a given direction in the manner indicated above: in certain cases, this suppression is not ensured automatically by simply annulling the energization of the electromagnetic means which have caused said blocking.

Now such automatic suppression is obligatory in certain installations, for example, to render possible an emergency evacuation under circumstances manifested by cutting off the general electrical supply of the anti-return device concerned.

In such circumstances, special means must be provided to temporarily and automatically urge the support of the roller in reverse direction from the preceding one.

GENERAL DESCRIPTION OF THE INVENTION

It is a particular object of the invention to provide such means enabling such sollicitations to be ensured temporarily and automatically in reverse direction.

Accordingly, the electromagnetic control means of the angular anti-return devices according to the invention comprise also two electro-magnets associated with the support of the roller so as to urge respectively this support in two reverse directions on their respective energizations, a source of electrical DC current and switch means enabling said source to be connected alternately to each of the electromagnets for its supply, or to neither of them, and they are characterized in that they comprise in addition an electrical capacitor mounted so as to be charged by the source each time that any one of the two electromagnets is supplied by this source and to be automatically discharged into the other electromagnet as soon as said supply is interrupted.

In advantageous embodiments, recourse has been had in addition to one and/or other of the following features:

the source is connected to the terminals of three circuit sections mounted in parallel with one another, namely a first section comprising the capacitor, a resistor and the contact placed in a first position of a two-position electric switch, a second section comprising one of the electromagnets and a first switch, and a third section comprising the second electromagnet and a second switch, and the capacitor is mounted so that on the one hand one of its plates is connected to the first terminals, of the two electromagnets, which are connected in common to the source and that on the other hand its other plate is connected, through the contact, of the abovesaid two-position switch, placed in its second position, either to the second terminal of the second electromagnet through a third switch, or to the second terminal of the first electromagnet through a fourth switch, the source is joined to the terminals of a fourth section of circuit comprising the coil of a relay adapted to actuate said two-position switch, the first switch is associated with the third switch so as to be opened and closed at the same time as the latter and it is the same with the second and fourth switches, in a device according to the preceding paragraph, each of the pairs of switches composed respectively of the first and third switches and of the second and fourth switches is mounted so as to be actuated automatically by the support of the wedging roller.

The invention comprises, apart from these main features, certain other features which are preferably used at the same time and which will be more explicitly considered below.

In the following, a preferred embodiment of the invention will be described with reference to the accompanying drawing given of course purely as a non-limiting example.

BRIEF DESCRIPTION OF THE DRAWINGS

FIGS. 1 and 2 of this drawing show diagrammatically an angular anti-return device with two directions of blocking associated with a turnstile and constructed according to the invention, in two different states corresponding respectively to the blocking of the turnstile in one direction and to the beginning of a subsequent unblocking due to a current failure.

FIG. 3 shows diagrammatically a portion of a modification of the same embodiment also constructed according to the invention.

DESCRIPTION OF PREFERRED EMBODIMENTS

The turnstile 1 is here shown schematically by an arm mounted pivotally around an axis X.

This turnstile 1 is associated with any desirable locking, control, elastic return, damping . . . means: these means are known and do not form part of the invention so that they will not be described in the present specification.

In manner known in itself, the angular movements of the turnstile are permitted in a first direction under certain conditions, such as the prior introduction of a valid ticket into an associated apparatus, and they are prevented in the opposite direction, at least beyond a given amplitude, in addition means are provided to select at will the direction S1 or S2 for which the angular movements of the turnstile are blocked.

For this purpose recourse is had to an anti-return device comprising:

a drum of revolution 2 of axis X angularly fast to the turnstile 1, a vee 3 bounded externally by two flat or slightly concave ramps $3_1$ and $3_2$ which intersect along a line Y parallel with the axis X, this vee being turned towards the drum and its bisector plane comprising the axis X, a roller 4 of axis Z parallel with the axis X, interposed between the drum 2 and the vee 3 and mounted on a movable support 5 so as to be movable between a first end position for which it is wedged between one $3_1$ of the ramps of the vee and the drum and another end position for which it is wedged between the other ramp $3_2$ of the vee and the drum, and electromagnetic means adapted to urge in turn the support 5 towards its two end positions corresponding to the wedgings of the roller.

These wedgings are obtained due to the fact that the distance between each ramp $3_1$, $3_2$ and the drum is slightly less than the diameter of the roller.

The electromagnetic means comprise:

a source 6 of DC electric current, two electromagnets 7 and 8 arranged on each side of the support 5, and an electric circuit connecting the source 6 to the electromagnets 7 and 8 so that there may be ensured as a function of need the energization of the electromagnet 7 alone, that of the electromagnet 8 alone and the deenergization of the two electromagnets.

The support 5 is advantageously constituted by a lever mounted pivotally around an axis U parallel with the axis X, which lever is constituted at least in part of a magnetic material so as to be sensitive to the attraction or repulsion of the electromagnets 7 and 8.

The roller 4 is constantly urged towards the bottom of the vee 3, for which position it is separated from the drum 2.

This solicitation can be exerted by a spring, but it is advantageously obtained through simple gravity, in which case the vee is situated beneath the drum, of which the axis X is then horizontal or slightly inclined to the horizontal, The operation of the device is as follows.

When none of the electromagnets 7 and 8 is energized, the roller 4 is applied to the bottom of the vee 3.

The rotations of the drum 2 are then free in both directions S1 and S2, likewise those of the turnstile 1.

If the electromagnet 7 is energized by connecting it to the source 6 (see FIG. 1), the support 5 is attracted magnetically by this electromagnet in the direction of the arrow F, which draws the roller 4 up to its end position for which it is wedged between the ramp 3 and the drum 2.

For this end position, rotations of the drum 2—and hence those of the turnstile 1— are still possible in the direction S1, but this is no longer the case in the opposite direction S2 since the roller 4 then exerts a wedging effect in this direction: in fact, any attempt at angular movement of the drum 2 in this direction S2 tends to draw the roller in said direction due to the fact of the friction which exists between this roller and the drum; now it cannot be drawn thus due to the fact of the throttling defined by the facing surfaces of the ramp $3_1$ and of the drum 2 beyond the end position then occupied by the roller 4.

To eliminate this angular blocking of the turnstile in the direction S2, it suffices generally to suppress the energizing of the electromagnet 7, which suppresses the magnetic attraction force F.

Such deenergization is, for example, obtained by the opening of a switch 9 mounted in series with the source 6.

What has just been explained for the blocking of the turnstile in the direction S2 is exactly transposable to the blocking in the direction S1: it suffices for this purpose to replace the electromagnet 7 by the electromagnet 8 in the foregoing description.

In certain cases, the simple suppression, indicated above, of the energizing of the electromagnet does not suffice to unwedge the roller 4.

The invention enables this drawback to be overcome by exerting automatically, and for a brief moment, on the support 5 a force opposite that which has caused the wedging of the roller, and whose intensity is sufficient to ensure unwedging.

This opposing force is exerted magnetically like the preceding one.

More precisely, there is provided a capacitor 10 mounted so that it is automatically charged by the source 6, through a resistor 11, when this source supplies any one of the two electromagnets 7 and 8 and so that it is automatically discharged into the other electromagnet as soon as said supply is cut off.

The relatively brief energization which is thus obtained of the "other" electromagnet has the effect of attracting the support 5 in the reverse direction from the preceding one.

In FIG. 2, which corresponds to the unblocking phase consecutive to the blocking described with reference to FIG. 1, the opposing unblocking force has been shown diagrammatically by the arrow G and corresponds to a discharge of the capacitor 10 into the electromagnet 8.

To be able to ensure the different blockings and unblockings of the roller 4 very simply for the two possible directions of blocking by means of a single capacitor 10, recourse is advantageously had to the electrical system illustrated in the drawings.

In this system, the terminals of the assembly constituted by the source 6 and the switch 9 are joined to four circuit sections mounted in parallel with another, namely:

a first section comprising in series a capacitor 10, the contact of a switch 12₁ placed in one of its two positions, called first position below, and the resistor 11, a second section comprising the electromagnet 7 and a first switch 13, a third section comprising the electromagnet 8 and a second switch 14, and a fourth section constituted by a relay coil 12 adapted to actuate the switch 12₁ so that the energizing of this coil places the contact of said switch in its first position and conversely.

In addition the capacitor 10 is mounted as follows.

One of its two plates is connected to the common terminal, of the two electromagnets 7 and 8,—which terminal will be called below first terminal—, which terminal is joined to the source 6 without passing through one or other of the switches 13 and 14.

The other plate of the capacitor 10 is connected, through the contact of the switch 12₁ placed in its second position:

on the one hand to the second terminal of the electromagnet 8 through a third switch 15, and on the other hand to the second terminal of the electromagnet 7, through a fourth switch 16.

The first switch 13 is coupled with the third switch 15 so that their respective closings and openings are simultaneous and this is the same for the second switch 14 with the fourth switch 16.

The operation of the circuit thus defined is as follows.

Suppose initially that it is desired to block the turnstile in the direction S2 (FIG. 1).

It suffices for this purpose, of course after closure of the switch 9, to close the dual switch 13,15.

The consequence of these closings is double:

on the one hand the electromagnet 7 is energized from the source 6 through the closed contact of the switch 13, which exerts on the lever 5 the force F and places the roller 4 in its position of blocking or wedging the turnstile in the direction S2.

on the other hand the relay 12 is energized and the capacitor 10 is therefore charged through the contact of the switch 12₁ placed in its first position.

The turnstile is hence free to rotate in the direction S1, when permission therefor is given, but not in the direction S2.

From this situation, if the energizing of the electromagnet 7 is cut off by the opening of the switch 9, immediately and automatically the following effects are observed:

the force F is annulled, the relay 12 is deenergized, which places the contact of the switch 12₁ in its second position, and the capacitor 10 is discharged into the electromagnet 8 through the closed contact of the switch 15, which exerts on the lever 5 the unblocking force G.

This lever 5 therefore returns to its neutral position (FIG. 2).

To ensure the desired wedging of the turnstile again in the direction S2, it then suffices to reestablish the continuity of the circuit by reclosing the switch 9.

In view of the total symmetry of the circuit with respect to the energizations of the two electromagnets, the blocking of the turnstile in the single direction S1 is ensured by closing the double switch 14,16 instead of closing the dual switch 13,15, and the consecutive unblocking of the turnstile is automatically actuated as previously by simple opening of the switch 9.

This switch 9 may be that of a manually reset circuit breaker.

It may also be quite simply constituted by the accidental interruption of the circuit following wear or an accident.

The actuation of the dual switches 13,15 and 14,16 may also be ensured manually.

According to an advantageous embodiment enabling assurance of correct actuation in each case and this alone, the controls concerned of the dual switches are servo-coupled to the movements of the lever 5.

Thus the simple placing of this lever 5 in its blocking position corresponding to FIG. 1 may be automatically manifested by the closure of the dual switch 13,15, and of the latter only, which, as described above, results successively in the constant maintenance of the lever 5 in the blocking position that it then occupies, then on the contrary its forced unblocking on the occurrence of a current failure. There is also to be seen in the drawings two abutment rollers 17 applied against the drum 2 so as to balance the transverse thrusts exerted by the roller 4 on this drum and hence on the shaft 18 of the turnstile.

As a result of which, and as emerges besides already from the foregoing, there is finally obtained an antiretum device for a turnstile whose constitution and operation are seen sufficiently from the foregoing.

This device presents over those previously known the advantage of ensuring with certainty the unwedging of the roller 4 every time that it is desired to restore to the turnstile a freedom of angular movement involving such unwedging.

As is self-evident, and as emerges besides already from the foregoing, the invention is in no way limited to those of its types of application and embodiments which have been more especially envisaged; it encompasses, on the contrary, all modifications thereof, particularly that illustrated in FIG. 3.

According to this modification, the third and fourth switches 15,16, instead of being coupled respectively to the first and to the second switches 13,14, are actuated respectively by two relays 17,18 mounted so as to be automatically energized by the simple closings of said first and second switches: more precisely, the first relay 17 is mounted in series with the first switch 13, between the latter and the common terminal of the two windings of electromagnets 7 and 8 and the second relay 18 is mounted in series with the second switch 14, between the latter and the abovesaid common terminal.

The two relays 17 and 18 advantageously form together a double bi-stable relay.

This modification is interesting in that it requires for its operation the closings of simple contacts 13 and 14, which may be presented in the form of micro-contacts actuatable in the usual manner by simple rotations of the turnstile.

I claim:

1. Dual action angular anti-return device associated with a turnstile and comprising a drum of revolution of axis X fast to the turnstile and coaxial with the latter, a fixed vee whose bisector plane contains the axis X of the drum, said vee being open on the side of said drum and positioned a short distance from the latter, a roller of axis parallel with the axis X, interposed between the vee and the drum and mounted so that, on a moveable support, it can be moved between a first end position for which it is blocked by wedging between the drum and one face of the vee and a second end position for which it is blocked by wedging between the drum and the other face of the vee, two electromagnets associated with the support of the roller so as to urge this support respectively in two reverse directions on their respective energizations, a source of DC electric current and switch means enabling said source to be connected alternately to each of the electromagnets for its supply, or to neither of them, said device comprising in addition an electric capacitor mounted so as to be charged by the source each time that either of the two electromagnets is supplied by this source and to be automatically discharged into the other electromagnet as soon as said supply is interrupted; the discharge from the capacitor causing the other electromagnet to momentarily energize and attract the support, thereby causing the roller to more rapidly assume a neutral, non-blocking position.

2. Anti-return device according to claim 1, wherein the source is joined to the terminals of three circuit sections mounted in parallel with one another, namely a first section comprising the capacitor, a resistor and the contact placed in a first position of an electric two-position switch, a second section comprising one of the electromagnets and a first switch and a third section comprising the second electromagnet and a second switch and wherein the capacitor is mounted so that on the one hand one of its plates is connected to the first terminals, of the two electromagnets, which are connected in common to the source and so that on the other hand its other plate is connected, through the contact, of the abovesaid two-position switch, placed in its second position, either to the second terminal of the second electromagnet through a third switch, or to the second terminal of the first electromagnet through a fourth switch.

3. Anti-return device according to claim 2, wherein the source is connected to the terminals of a fourth circuit section comprising the winding of a relay adapted to actuate the switch.

4. Anti-return device according to claim 3, wherein the first switch is associated with the third so as to be opened and closed at the same time as the latter and wherein the arrangement is the same for the second and the fourth switches.

5. Anti-return device according to claim 4, wherein each of the pairs of switches composed respectively of the first and third switches and of the second and fourth switches is mounted so as to be actuated automatically by the support of the wedging roller.

6. Anti-return device according to claim 5, wherein the third and fourth switches are mounted so to be closed respectively by the energizations of two relays mounted in series with respectively the first and second switches.

7. Anti-return device according to claim 2, wherein the first switch is associated with the third so as to be opened and closed at the same time as the latter and wherein the arrangement is the same for the second and fourth switches.

8. Anti-return device according to claim 7, wherein each of the pairs of switches composed respectively of the first and third switches and of the second and fourth switches is mounted so as to be actuated automatically by the support of the wedging roller.

9. Anti-return device according to claim 7, wherein the third and fourth switches are mounted so to be closed respectively by the energizations of two relays mounted in series with respectively the first and second switches.

10. Anti-return device according to claim 9, wherein the two relays together form a double bi-stable relay.

* * * * *